United States Patent [19]
Nomura et al.

[11] Patent Number: 6,078,237
[45] Date of Patent: Jun. 20, 2000

[54] RARE EARTH-BASED PERMANENT MAGNET MATERIAL AND METHOD FOR THE PREPARATION THEREOF

[75] Inventors: Tadao Nomura; Ken Ohashi; Takehisa Minowa; Yoshio Tawara; Masaru Ito, all of Fukui-ken, Japan

[73] Assignee: Shin-Etsu Chemical Co., Ltd., Japan

[21] Appl. No.: 09/218,005

[22] Filed: Dec. 22, 1998

[30] Foreign Application Priority Data

Dec. 22, 1997 [JP] Japan ................................. 9-352743

[51] Int. Cl.$^7$ ........................................ H01F 7/02
[52] U.S. Cl. ........................................ 335/302; 252/62.54
[58] Field of Search ........................ 335/302–306; 252/62.54, 62.55; 148/302, 103–5

[56] References Cited

U.S. PATENT DOCUMENTS

| | | | |
|---|---|---|---|
| 5,411,608 | 5/1995 | Hazelton et al. | 148/302 |
| 5,595,608 | 1/1997 | Takebuchi et al. | 148/104 |
| 5,597,425 | 1/1997 | Akioka et al. | 148/302 |
| 5,725,792 | 3/1998 | Panchanathan | 252/62.54 |

FOREIGN PATENT DOCUMENTS 37 09 138  9/1988  Germany.

OTHER PUBLICATIONS

W.C. Chang et al., *J. Appl. Phys.*, 79(8), 4843–4845 (1996). (No Month).

*Patent Abstracts of Japan*, 11(212) (E–522) (abstract of JP 62–035602 (1987) (No Month).

Primary Examiner—Lincoln Donovan
Attorney, Agent, or Firm—Wenderoth, Lind & Ponack, L.L.P.

[57] ABSTRACT

Disclosed is a rare earth-based, magnetically anisotropic permanent magnet material consisting of a rare earth element, e.g., neodymium or praseodymium, iron optional in combination with cobalt and boron and having excellent magnetic properties by virtue of the magnetic coupling between the magnetically hard and soft phases. The magnet material has a structure consisting of crystalline particles of, e.g., $Nd_2Fe_{14}B$, having a particle diameter of 1 μm or larger and fine crystals of iron of submicron size in a rod-shaped or platelet form precipitated within each crystalline particle of $Nd_2Fe_{14}B$. This magnet material can be prepared by several different methods including, for example, a solid phase reaction of an intermetallic compound of $Nd_2Fe_{17}$ with boron to effect a double decomposition reaction producing $Nd_2Fe_{14}B$ and iron.

6 Claims, No Drawings

RARE EARTH-BASED PERMANENT MAGNET MATERIAL AND METHOD FOR THE PREPARATION THEREOF

BACKGROUND OF THE INVENTION

The present invention relates to a magnetically anisotropic rare earth-based permanent magnet material and a method for the preparation thereof.

In the modern magnet industry, rare earth-based permanent magnets are under mass production including those based on a samarium-cobalt alloy and those based on a neodymium-iron-boron alloy, of which the demand for the neodymium-iron-boron permanent magnets, referred to as the Nd—Fe—B magnets hereinafter, is rapidly expanding by virtue of their high magnetic properties and inexpensiveness due to the low material costs as compared with the samarium-cobalt magnets.

Several methods have been developed for the manufacture of the Nd—Fe—B magnets and are now industrially practiced, of which the most widely employed is the so-called sintering method. An Nd—Fe—B magnet prepared by the sintering method has a metallographic structure consisting of a magnetically hard phase of $Nd_2Fe_{14}B$ as the principal phase in combination with other phases including a phase rich in the content of Nd and a phase rich in the content of B such as $Nd_{1.1}Fe_4B_4$. In the preparation of such an Nd—Fe—B magnet, an alloy of Nd, Fe and B having a chemical composition somewhat richer in the conents of Nd and B than the stoichiometric composition of $Nd_2Fe_{14}B$ is finely pulverized into a powder having a particle size of a few micrometers and the fine powder is compression-molded into a powder compact in a magnetic field to align the easy magnetization axes of the particles along the direction of the magnetic field. The thus prepared green body is subjected to a sintering treatment at a temperature of about 1100° C. followed by an aging treatment at a lower temperature to complete a magnetically anisotropic permanent magnet material (see, for example, M. Sagawa, et al. Japanese Journal of Applied Physics, volume 26, page 785, 1987). The mechanism for the appearance of the high coercive force in the anisotropic permanent magnet of this type is presumably that the principal phase of $Nd_2Fe_{14}B$ has the interfacial surface cleaned by the Nd-rich phase surrounding the same.

An alternative method for the preparation of the Nd—Fe—B magnets has been developed, in which the base material of the magnet is a quenched thin ribbon of the alloy obtained by the so-called melt-spun method to effect high-speed solidification of the alloy melt ejected at a rotating cooling roller (see, for example, R. W. Lee, Physics Letter, volume 46, page 790, 1985, and elsewhere). Although the magnet prepared by this method also has a metallographic structure of $Nd_2Fe_{14}B$ as the principal phase, the high coercive force of the magnet is a consequence of the extremely small crystal size as compared with the sintered magnets ranging from 20 to 100 nm to be comparable with the size of the single magnetic domains.

On the other hand, extensive investigations are now under way to develop a further upgraded rare earth-based permanent magnet material for the next generation and, as a result thereof, so-called nanocomposite magnets are highlighted in recent years (see, for example, E. F. Kneller, et al., IEEE Transaction Magnetics, 1991, page 3588, and elsewhere). A nanocomposite permanent magnet has a structure consisting of a magnetically hard phase and a magnetically soft phase each finely dispersed in the other in a fineness in the order of a few nanometers. In this structure, the magnetization of the magnetically soft phase is little susceptible to reversal as a consequence of magnetic coupling of the exchange interaction between the two phases so that the magnetic behavior of the magnet resembles that of a single magnetically hard phase. Namely, a possibility is given by the technology of nanocomposite magnets for accomplishing a greatly increased saturation magnetization without any decrease in the coercive force even by starting from a combination of conventional base materials. For example, a theoretically possible highest value of the maximum energy product $(BH)_{max}$ of as high as 137 MGOe is reported by calculation for a rare earth-based magnetically anisotropic nanocomposite a magnet having a composition of a combination of the magnetically hard and soft phases expressed by the formula $Sm_2Fe_{17}N_3/Fe$—Co (see R. Skomski, et al., Physical Review B, volume 48, page 15812, 1993).

Several rare earth-based nanocomposite permanent magnets have heretofore been actually prepared for the combinations of the hard and soft phases including those expressed by the formulas $Nd_2Fe_{14}B/Fe_3B$ (R. Coehorn, et al., Journal de Physique, volume 49, page C8-669, 1988), $Nd_2Fe_{14}B/Fe$ (Japanese Patent Kokai 7-173501 and 7-176417; L. Withanawasam, et al., Journal of Applied Physiques, volume 76, page 7065, 1994, and elsewhere) and $Sm_2Fe_{14}B/Fe$ (J. Ding, et al., Journal of Magnetics and Magnetic Materials, volume 124, page L1, 1993). In these experimental works, an amorphous alloy is first prepared by the roller quenching method or by the mechanical alloying method followed by a heat treatment of the alloy to effect microcrystallization for a finely dispersed structure or, alternatively, by conducting the roller quenching method at a somewhat decreased quenching rate to effect in situ microcrystallization. In each of these methods, the process conditions are optimized so as to accomplish possible highest values of the magnetic properties such as the coercive force and residual magnetization.

Since the crystallite diameter in these nanocomposite magnet materials is so fine as to be a few tens of nanometers, a powder of a particle diameter of several micrometers obtained by merely pulverizing the material consists of particles each containing a large number of magnetically hard crystalline grains such as $Nd_2Fe_{14}B$ and $Sm_2Fe_{17}N_3$ and magnetically soft crystallite grains such as Fe and $Fe_3B$ in a random orientation so that the alloy particles per se are each isotropic. As a consequence, the particles cannot be aligned relative to the easy magnetization axes of the magnetic particles as in the anisotropic sintered magnet so that the magnetic properties of the magnets obtained by these methods are necessarily inferior.

On the other hand, it is known that the reaction between Fe and $Nd_2Fe_{14}B$ is peritectic (see M. Sagawa, Japanese Journal of Applied Physics, volume 26, page 785, 1987) so that, when an alloy melt having a composition richer in the content of Fe than the stoichiometric composition of $Nd_2Fe_{14}B$ is cooled down and solidified in a conventional manner as in the preparation of the sintered magnets, incipient crystals of Fe are first formed to be followed by the solidification and formation of the $Nd_2Fe_{14}B$ crystals. The incipient crystals of Fe are each dendritic having a size of at least several micrometers to be oversize for the above mentioned magnetic coupling. This results not only in the failure of obtaining a nanocomposite structure of the magnet but also, if such coarse dendritic crystals remain in the final magnet structure, in a great decrease in the magnetic properties of the magnet because the demagnetization curve of the magnet exhibits a cornered bent in the vicinity of zero-magnetic field.

Thus, despite the so great possibility of obtaining a high-grade permanent magnet by the theoretical consideration, no reports are available for the actual preparation of a rare earth-based nanocomposite permanent magnet, development of which is eagerly desired in the industry.

SUMMARY OF THE INVENTION

In view of the above described present status of the magnet technology, the present invention has an object to provide a novel rare earth-based permanent magnet material having sufficiently high magnetic anisotropy with a saturation magnetization still larger than that of the $Nd_2Fe_{14}B$ single phase by effecting an improvement on the conventional method for the preparation of a rare earth-based permanent magnet.

Thus, the rare earth-based permanent magnet material provided by the invention is a permanent magnet material comprising, as the essential ingredients, at least one kind of the rare earth elements R, iron Fe and boron B and having a metallographic structure consisting of a magnetically hard phase of the formula $R_2Fe_{14}B$ and a magnetically soft phase of iron Fe, in which the phase of $R_2Fe_{14}B$ is in the form of crystalline particles having a particle diameter of at least 1 $\mu$m and the phase of iron is precipitated within the crystalline particles of $R_2Fe_{14}B$ in a rod-shaped form or in the form of a platelet having a dimension not exceeding 200 nm.

In particular, the rare earth element R is preferably neodymium or praseodymium.

In an alternative aspect of the inventive rare earth-based permanent magnet material, the iron constituent in the magnetically hard and soft phases can be partly replace with cobalt so that the material is defined as a permanent magnet material comprising, as the essential elements, at least one kind of the rare earth elements R, iron Fe, cobalt Co and boron B and having a metallographic structure consisting of a magnetically hard phase of the formula $R_2(Fe,Co)_{14}B$ and a magnetically soft phase of an Fe—Co alloy, of which the phase of $R_2(Fe,Co)_{14}B$ is in the form of crystalline particles having a particle diameter of at least 1 $\mu$m and the phase of Fe—Co alloy is precipitated within the crystalline particles of $R_2(Fe,Co)_{14}B$ in a rod-shaped form or in the form of a platelet.

The above defined rare earth-based permanent magnet material can be prepared in either one of the following two different methods in which:

i) boron is diffused into the crystalline particles of $R_2Fe_{17}$ or $R_2(Fe,Co)_{17}$ to effect a solid-phase reaction therebetween at an elevated temperature; or ii) a melt of an alloy consisting of a rare earth element, iron and boron or a rare earth element, iron, cobalt and boron is subjected to solidification by quenching at such a controlled rate of solidification that the solidified alloy does not have an amorphous structure.

DETAILED DESCRIPTION OF THE PREFERRED EMBODIMENTS

As is described above, the most characteristic feature of the inventive rare earth-based permanent magnet material consists in the unique metallographic structure of the material in which the magnetically soft phase of iron Fe or an iron-cobalt alloy Fe—Co is precipitated within the crystalline particles of the magnetically hard phase of the formula $R_2Fe_{14}B$ or $R_2(Fe,Co)_{14}B$ having a particle diameter of at least 1 $\mu$m in a rod-shaped form or in the form of a platelet so as to establish magnetic coupling between the magnetically hard and soft phases.

Since the rare earth element R is preferably neodymium Nd or praseodymium Pr, following description is given for neodymium taken as an example of the rare earth element although the description is applicable also to praseodymium and to any other rare earth elements including yttrium. It is optional that neodymium or praseodymium is partly replaced with one or more of other rare earth elements such as terbium, dysprosium and yttrium each in a limited amount. In particular, the description is given for the combination of $Nd_2Fe_{14}B$ as the magnetically hard phase and iron Fe as the magnetically soft phase although the description is equally applicable when a part of iron is replaced with cobalt. It is further optional to replace a part of iron with one or more of other adjuvant elements including aluminum, silicon, titanium, vanadium, chromium, manganese, nickel, copper, zinc, gallium, zirconium, niobium, molybdenum, ruthenium, rhodium, palladium, silver, cadmium, indium, tin, hafnium, tantalum, tungsten, rhenium, osmium, iridium, platinum, gold, thallium, lead and bismuth in an amount not exceeding 5 atomic % since, when the amount of these adjuvant elements is too large, the saturation magnetization of the magnet is decreased.

The above defined rare earth-based permanent magnet material can be prepared by three different method each described below.

The first of the preparation methods is a method of solid-phase reaction between the intermetallic compound of $Nd_2Fe_{17}$ as the starting material and boron, which method has been newly developed by the inventors. Thus, the intermetallic compound and boron each in the form of a fine powder are blended together in a specified proportion and the powder blend is compression-molded into a powder compact which is subjected to a heat treatment at a temperature lower than 1155° C., which is the melting point of the intermetallic compound $Nd_2Fe_{14}B$, but, preferably, higher than 600° C. so that a solid-phase double decomposition reaction proceeds between the particles according to the reaction equation:

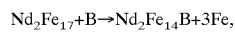

$$Nd_2Fe_{17}+B \rightarrow Nd_2Fe_{14}B+3Fe,$$

to produce a magnetically hard phase of $Nd_2Fe_{14}B$ and a magnetically soft phase of iron forming a structure consisting of crystalline particles of the magnetically hard phase having a particle diameter of several micrometers each containing a plural number of the precipitates of the magnetically soft phase in a rod-shaped form having a submicron size. The diameter of the iron precipitates can be controlled by adequately selecting the conditions of the heat treatment and a smaller diameter desired for the iron precipitates can be obtained by decreasing the temperature of the heat treatment thus to establish magnetic coupling with the magnetically hard phase. Although this reaction proceeds into inside of the particle of the $Nd_2Fe_{14}B$ phase as the length of time for the heat treatment is extended, the diameter of the rod-shaped Fe phase little depends on the length of time for the heat treatment. Accordingly, the heat treatment should be continued until the particles of the Nd2Fe14B phase have pertained as a whole to the reaction leading to disappearance thereof.

It is sometimes advantageous that the boron powder used in the above mentioned boriding treatment is admixed with a small amount of a powder of metallic calcium which forms a liquid phase in the heat treatment at a temperature higher than the melting point thereof to promote diffusion of boron. The thus used calcium remaining after the heat treatment can be removed by washing with water. It is further optional that the powder of boron used in the boriding treatment is replaced with a powder of a boron oxide such as $B_2O_3$. An alternative boriding agent, in which the neodymium-iron alloy is heated, is a mixture of a powder of boron with sodium carbonate. Further, gaseous boron compounds such as boron trichloride $BCl_3$ and diborane $B_2H_6$ can be used as the boriding agent.

The thus obtained reaction product of the boriding treatment is then pulverized into fine particles each consisting of a single crystal of $Nd_2Fe_{14}B$ containing a plural number of rod-shaped crystals of iron precipitated therein. These particles, which can be readily aligned in a magnetic field relative to the easy magnetization axes thereof along the direction of the magnetic field and the saturation magnetization of the particles is higher than that of the $Nd_2Fe_{14}B$ particles per se without precipitation of the rod-shaped iron crystals so that the powder can be used as a base material for the preparation of a high-performance magnetically anisotropic Nd—Fe—B magnet. The particle diameter of the $Nd_2Fe_{14}B$ crystals containing the rod-shaped iron precipitates is preferably at least 1 μm because, when the particle diameter thereof is too small, the magnetic anisotropy of the particles per se is greatly decreased.

It is essential in this first method to accomplish the present invention that the starting $Nd_2Fe_{17}$ phase pertains to the reaction with boron in a solid-phase reaction without involving any molten state so that the reaction is not peritectic but eutectic.

The permanent magnet material of the present invention can be prepared also by a second method in which a melt of an alloy of which the composition is somewhat richer in the content of iron than the stoichiometry of $Nd_2Fe_{14}B$ is solidified by quenching under controlled conditions. Quenching of the molten alloy can be performed by the methods of ejection at a rotating roller, splatting and gas atomizing. It is essential in conducting quenching of the molten alloy that the rate of solidification is adequately controlled because, when the solidification rate is too high, the solidified alloy has an amorphous or microcrystalline structure so that a powder consisting of single crystals of $Nd_2Fe_{14}B$ cannot be obtained by pulverizing the solidified alloy while, when the solidification rate is too low, incipient crystals of iron are first formed by solidification. Namely, the quenching rate should be controlled such that crystalline particles of $Nd_2Fe_{14}B$ having a particle diameter of at least 1 μm are formed in the solidified alloy without formation of incipient crystals of iron. In the roller quenching method using a single roller, for example, the peripheral velocity of the rotating roller is selected in the range from 5 to 20 meters/second or, preferably, from 10 to 17 meters/second, though dependent on the composition of the starting alloy melt, when the molten alloy consists of from 8.0 to 11.8 atomic % of neodymium, from 3.0 to 15.0 atomic % of boron and the balance of iron. As a trend, a higher content of iron in the alloy melt requires a higher rate of solidification. When this quenching method is conducted under adequate conditions, the solidified material has a structure consisting of crystals of $Nd_2Fe_{14}B$ each containing the excess of iron precipitated within the crystals in an elongated form. The reason for the formation of the eutectic structure, different from peritectic, is presumably that the step for the crystallization-out of the incipient crystals of iron in the melt is skipped by quenching.

In the conventional nanocomposite magnetic materials in which the phases of $Nd_2Fe_{14}B$ and iron are under magnetic coupling, each of the crystalline phases must be dispersed in a fineness of only a few tens of nanometers so that the heat treatment is conducted at about 700° C. In order to avoid undue growth of the crystals. In contrast thereto, in the present invention, the crystals of $Nd_2Fe_{14}B$ per se each contain fine precipitates of iron capable of pertaining to the magnetic coupling with the principal phase so that the heat treatment temperature can be as high as 800° C. or higher to have the crystalline particles grown into a size of 1 μm or larger without adversely affecting the magnetic coupling between phases.

The alloy materials obtained by the above described inventive methods each have a composite eutectic structure consisting of crystals of $Nd_2Fe_{14}B$ each containing finely precipitated phase of iron. This eutectic structure is unique and quite different from the peritectic structure of $Nd_2Fe_{14}B$ heretofore reported.

The above described alloy is finely pulverized to particles each having a size of a particle consisting of a single crystal of $Nd_2Fe_{14}B$. The powder is used, as a blend with a powder of an alloy rich in the content of neodymium or boron, as a base material of an anisotropic sintered Nd—Fe—B permanent magnet in a known process in which the powder is compression-molded in a magnetic field to give a powder compact which is subjected to a heat treatment for sintering or processed into an anisotropic bond magnet by blending with a binder and molding in a magnetic field.

In the following, the present invention is described in more detail by way of Examples which, however, never limit the scope of the invention in any way.

EXAMPLE 1

Metals of neodymium and iron were taken in an atomic proportion of 10.6:89.4 i.e. 2:17, and they were melted together in an arc furnace under an atmosphere of argon to give an alloy of the composition $Nd_2Fe_{17}$, which was subjected to a solution heat treatment at 1100° C. for 10 hours followed by pulverization into an alloy powder having a particle diameter not exceeding 100 μm. The alloy powder was blended with a powder of boron having a particle diameter not exceeding 50 μm in a molar proportion of 1:1 and further blended with granules of metallic calcium followed by compression molding of the powder blend into a block which was subjected to a heat treatment at 850° C. for 12 hours under an atmosphere of argon followed by cooling.

The composite block after the heat treatment and taken out of the furnace was pulverized into a powder having a particle size of about 100 μm which was washed with water to remove calcium followed by vacuum drying. The powder X-ray diffraction pattern of this powder indicated two crystalline phases of $Nd_2Fe_{14}B$ and iron. A metallographic examination of the cross sectional structure by using a polarizing microscope indicated that the crystals of $Nd_2Fe_{14}B$ had an average particle diameter of about 5 μm. A further examination of the cross sectional structure by means of the electron microscopic images obtained with a scanning electron microscope and a transmission electron microscope indicated precipitation of a large number of rod-shaped crystals of iron having a diameter not exceeding 0.1 μm within each crystalline particle of $Nd_2Fe_{14}B$.

The powder was further pulverized into a fine powder in a ball mill into particles having an average particle diameter not exceeding 5 μm and the fine powder was blended with a molten paraffin and the blend was cooled and solidified in a magnetic field of 14 kOe. The thus consolidated paraffin-bonded magnet block was subjected to the measurement of the magnetic properties including the magnetization under application of a magnetic field of 20 kOe in the directions parallel to and perpendicular to the direction of the magnetic field during solidification of the powder blend with molten paraffin to give values of the magnetization $l_p$ and $l_a$, respectively. The value of $l_p$ obtained here was 16.3 KG and the ratio of $l_a:l_p$ as a measure of the magnetic anisotropy was 0.69. Further, absence of any cornered bent in the demagnetization curve indicated that magnetic coupling was established between the phases of $Nd_2Fe_{14}B$ and iron.

EXAMPLE 2

Neodymium, iron and boron each in the metallic or elementary form were taken in an atomic proportion of 9.5:84.5:6.0 and they were melted together in an arc furnace followed by cooling to give a solidified alloy. A portion of the alloy taken in an ejection nozzle of fused silica glass was melted under an atmosphere of argon by high-frequency induction heating and the melt was ejected out of the nozzle at the surface of a copper roller rotating at a peripheral velocity of 14 meters/second to be quenched into a solidified alloy in the form of a thin ribbon.

An X-ray diffraction pattern of the thus obtained thin alloy ribbon indicated formation of the phases of $Nd_2Fe_{14}B$ and iron. A microscopic examination of the cross sectional structure of the thin alloy ribbon on a polarizing microscope indicated that the crystals of $Nd_2Fe_{14}B$ had grown to have a particle diameter of 10 $\mu$m or larger. Further examination of the cross sectional structure by using a scanning electron microscope and a transmission electron microscope indicated a large number of rod-shaped crystals of iron having a diameter not exceeding 0.1 $\mu$m precipitated in each particle of the host phase.

In the next place, the thin alloy ribbons were pulverized in a ball mill into a fine powder having an average particle diameter not exceeding 5 $\mu$m and the powder was subjected to the test of the magnetic anisotropy in the same manner as in Example 1 to find that the value of $l_p$ was 16.6 kG and the ratio of $l_a:l_p$ was 0.49. Further, absence of any cornered bent in the demagnetization curve indicated that magnetic coupling was established between the phases of $Nd_2Fe_{14}B$ and iron.

EXAMPLE 3

Metals of praseodymium, iron and cobalt were taken in an atomic proportion of 10.6:80.5:8.9 corresponding to the composition of the formula $Pr_2(Fe_{0.9}Co_{0.1})_{17}$ and they were melted together in an arc furnace under an atmosphere of argon to give an alloy of the above mentioned composition, which was subjected to a solution heat treatment by heating at 1100° C. for 10 hours followed by pulverization into an alloy powder having a particle diameter not exceeding 100 $\mu$m. The alloy powder was blended with a powder of boron having a particle diameter not exceeding 50 $\mu$m in a molar proportion of 1:1 and further blended with granules of metallic calcium followed by compression molding of the powder blend into a block which was subjected to a heat treatment at 850° C. for 12 hours under an atmosphere of argon followed by cooling.

The composite block after the heat treatment and taken out of the furnace was again pulverized into a powder having a particle size of about 100 $\mu$m which was washed with water to remove calcium followed by vacuum drying. The powder X-ray diffraction pattern of this powder indicated two crystalline phases of $Pr_2(Fe,Co)_{14}B$ and an alloy of iron and cobalt. A metallographic examination of the cross sectional structure by using a polarizing microscope indicated that the crystals of $Pr_2(Fe,Co)_{14}B$ had an average particle diameter of about 5 $\mu$m. A further examination of the cross sectional structure by a scanning electron microscope and a transmission electron microscope indicated precipitation of a large number of rod-shaped crystals of the iron-cobalt alloy having a diameter not exceeding 0.1 $\mu$m within each crystalline particle of $Pr_2(Fe,Co)_{14}B$.

In the next place, the alloy was pulverized in a ball mill into a fine powder having an average particle diameter not exceeding 5 $\mu$m and the powder was subjected to the test of the magnetic anisotropy in the same manner as in Example 1 to find that the value of $l_p$ was 16.6 kG and the ratio of $l_a:l_p$ was 0.61. Further, absence of any cornered bent in the demagnetization curve indicated that magnetic coupling was established between the phases of $Pr_2(Fe,Co)_{14}B$ and the alloy of iron and cobalt.

EXAMPLE 4

Neodymium, iron, cobalt and boron each in the metallic or elementary for were taken in an atomic proportion of 9.0:78.0:8.5:4.5 and they were melted together in an arc furnace to give an alloy melt. A portion of the alloy taken in an ejection nozzle of fused silica glass was melted by high-frequency induction heating under an atmosphere of argon and ejected out of the nozzle at the surface of a copper roller rotating at a peripheral velocity of 14 meters/second to give a thin ribbon of the alloy by quenching.

An X-ray diffraction pattern of the thin alloy ribbon indicated formation of the phases of $Nd_2(Fe,Co)_{14}B$ and an iron-cobalt alloy. A microscopic examination of the cross sectional structure of the thin alloy ribbon on a polarizing microscope indicated that the crystals of $Nd_2(Fe,Co)_{14}B$ had grown to have a particle diameter of 10 $\mu$m or larger. Further examination of the cross sectional structure by using a scanning electron microscope indicated a large number of rod-shaped crystals of the iron-cobalt alloy having a diameter not exceeding 0.1 $\mu$m precipitated in each particle of the host phase of $Nd_2(Fe,Co)_{14}B$.

In the next place, the thin alloy ribbons were pulverized in a ball mill into a fine powder having an average particle diameter not exceeding 5 $\mu$m and the powder was subjected to the test of the magnetic anisotropy in the same manner as in Example 1 to find that the value of $l_p$ was 16.9 kG and the ratio of $l_a l_p$ was 0.51. Further, absence of any cornered bent in the demagnetization curve indicated that magnetic coupling was established between the phases of $Nd_2(Fe,Co)_{14}B$ and an iron-cobalt alloy.

COMPARATIVE EXAMPLE 1

Neodymium, iron and boron each in the metallic or elementary form were taken in an atomic proportion of 8.0:88.0:4.0 and they were melted together by high-frequency induction heating to make an alloy. A metallographic examination of the solidified alloy indicated that the phases constituting the alloy included the phase of $Nd_2Fe_{14}B$, the phase of iron and a phase rich in the content of neodymium. The iron phase, however, was in the form of dendritic crystals having a width of 5 $\mu$m or larger and not in the form of rod-shaped crystals having a diameter not exceeding 0.1 $\mu$m forming a eutectic structure as in the Examples.

Further, the alloy was pulverized in a ball mill into a fine powder having a particle diameter not exceeding 5 $\mu$m and the powder was subjected to the test of the magnetic properties in the same manner as in the Examples to find that the demagnetization curve had a cornered bent and the hysteresis loop had a stepped irregularity.

COMPARATIVE EXAMPLE 2

Neodymium, iron and boron each in the metallic or elementary form were taken in an atomic proportion of 9.0:85.0:6.0 and they were melted together in an arc furnace to make an alloy. A portion of the alloy taken in an ejection nozzle of fused silica glass was melted by high-frequency induction heating and the melt was ejected out of the nozzle at the surface of a copper roller rotating at a peripheral velocity of 45 meters/second to give thin alloy ribbons which had an amorphous structure. The thin alloy ribbons were sealed in a fused silica glass tube under vacuum and subjected to a heat treatment therein by heating at 700° C. for 5 minutes followed by cooling.

The results of an X-ray diffractometric study and observation with a transmission electron microscope indicated that the thin alloy ribbon after the heat treatment had a metallographic structure consisting of crystals of $Nd_2Fe_{14}B$ and crystals of iron dispersed in a fineness of 15 to 25 nm. The crystals of iron had a globular configuration and were not in a rod-shaped or platelet form.

Further, the thin alloy ribbons after the heat treatment were pulverized in a ball mill into a fine powder having a particle diameter not exceeding 5 μm and the powder was subjected to the test of the magnetic anisotropy in the same manner as in the Examples to find that the ratio of $l_a:l_p$ was 0.98 indicating substantial absence of magnetic anisotropy.

What is claimed is:

1. A rare earth-based permanent magnet material comprising, as the essential ingredients, at least one kind of the rare earth elements R, iron Fe and boron B and having a metallographic structure consisting of a magnetically hard phase of the formula $R_2Fe_{14}B$ and a magnetically soft phase of iron Fe, in which the phase of $R_2Fe_{14}B$ is in the form of crystalline particles having a particle diameter of at least 1 μm and the phase of iron is precipitated within the crystalline particles of $R_2Fe_{14}B$ in a rod-shaped form or in the form of a platelet having a dimension not exceeding 200 nm.

2. The rare earth-based permanent magnet material as claimed in claim 1 in which the rare earth element denoted by R is neodymium.

3. The rare earth-based permanent magnet material as claimed in claim 1 in which the rare earth element denoted by R is praseodymium.

4. A rare earth-based permanent magnet material comprising, as the essential ingredients, at least one kind of the rare earth elements R, iron Fe, cobalt Co and boron B and having a metallographic structure consisting of a magnetically hard phase of the formula $R_2(Fe,Co)_{14}B$ and a magnetically soft phase of an alloy of iron and cobalt, in which the phase of $R_2(Fe,Co)_{14}B$ is in the form of crystalline particles having a particle diameter of at least 1 μm and the phase of the alloy of iron and cobalt is precipitated within the crystalline particles of $R_2(Fe,Co)_{14}B$ in a rod-shaped form or in the form of a platelet having a dimension not exceeding 200 nm.

5. The rare earth-based permanent magnet material as claimed in claim 4 in which the rare earth element denoted by R is neodymium.

6. The rare earth-based permanent magnet material as claimed in claim 4 in which the rare earth element denoted by R is praseodymium.

* * * * *